(12) United States Patent
Lecerf et al.

(10) Patent No.: US 10,030,471 B2
(45) Date of Patent: Jul. 24, 2018

(54) WELL TREATMENT

(71) Applicant: SCHLUMBERGER TECHNOLOGY CORPORATION, Sugar Land, TX (US)

(72) Inventors: Bruno Lecerf, Sugar Land, TX (US); John Mayo, Houston, TX (US); Jacob M. Kariampally, Pearland, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/790,256

(22) Filed: Jul. 2, 2015

(65) Prior Publication Data

US 2017/0002623 A1 Jan. 5, 2017

(51) Int. Cl.
| | |
|---|---|
| *E21B 43/26* | (2006.01) |
| *E21B 33/138* | (2006.01) |
| *E21B 43/22* | (2006.01) |
| *C09K 8/80* | (2006.01) |
| *C09K 8/74* | (2006.01) |
| *C09K 8/62* | (2006.01) |
| *C09K 8/76* | (2006.01) |
| *C09K 8/52* | (2006.01) |

(52) U.S. Cl.
CPC .............. *E21B 33/138* (2013.01); *C09K 8/62* (2013.01); *C09K 8/74* (2013.01); *C09K 8/76* (2013.01); *E21B 43/26* (2013.01); *C09K 8/52* (2013.01); *C09K 2208/08* (2013.01)

(58) Field of Classification Search
CPC ...... E21B 43/267; E21B 43/26; E21B 43/261; C09K 2208/08; C09K 8/68; C09K 8/80; C09K 8/62; C09K 8/72; C09K 8/74
See application file for complete search history.

(56) References Cited

U.S. PATENT DOCUMENTS

| | | | |
|---|---|---|---|
| 4,848,467 | A | 7/1989 | Cantu et al. |
| 4,957,165 | A | 9/1990 | Cantu et al. |
| 4,986,355 | A | 1/1991 | Casad et al. |
| 5,258,137 | A | 11/1993 | Bonekamp et al. |
| 5,551,516 | A | 9/1996 | Norman et al. |
| 5,924,295 | A | 7/1999 | Park |
| 5,979,557 | A | 11/1999 | Card et al. |
| 6,207,620 | B1 | 3/2001 | Gonzalez et al. |
| 6,239,183 | B1 | 5/2001 | Farmer et al. |

(Continued)

FOREIGN PATENT DOCUMENTS

| | | |
|---|---|---|
| EP | 0278540 B1 | 8/1992 |
| WO | 2012064212 A1 | 5/2012 |

OTHER PUBLICATIONS

International Search Report and Written Opinion issued in International Patent Application No. PCT/US2016/039691 dated Oct. 10, 2016; 13 pages.

*Primary Examiner* — Zakiya W Bates
(74) *Attorney, Agent, or Firm* — Andrea E. Tran

(57) ABSTRACT

Methods of treating a subterranean formation penetrated by a well bore, by providing a first acidic treatment fluid comprising fibers to fracture the formation and providing a non-acidic treatment fluid comprising multiple particle size acid precursors having a first average particle size between about 3 mm and 2 cm and a second amount of acid precursors having a second average size between about 1.6 and 20 times smaller than the first average particle size or a second amount of flakes having a second average size up to 10 times smaller than the first average particle size.

18 Claims, 3 Drawing Sheets

(56) References Cited

U.S. PATENT DOCUMENTS

| | | |
|---|---|---|
| 6,435,277 B1 | 8/2002 | Qu et al. |
| 6,506,710 B1 | 1/2003 | Hoey et al. |
| 6,667,280 B2 | 12/2003 | Chang et al. |
| 6,703,352 B2 | 3/2004 | Dahayanake et al. |
| 7,060,661 B2 | 6/2006 | Dobson et al. |
| 7,166,560 B2 | 1/2007 | Still et al. |
| 7,303,018 B2 | 12/2007 | Cawiezel et al. |
| 7,350,572 B2 | 4/2008 | Fredd et al. |
| 7,510,009 B2 | 3/2009 | Cawiezel et al. |
| 7,784,541 B2 | 8/2010 | Hartman et al. |
| 8,905,133 B2 | 12/2014 | Daniels et al. |
| 2003/0119680 A1 | 6/2003 | Chang et al. |
| 2005/0126786 A1 | 6/2005 | Fu et al. |
| 2006/0042797 A1 | 3/2006 | Fredd et al. |
| 2006/0054325 A1* | 3/2006 | Brown ............... C09K 8/62 166/308.2 |
| 2008/0093073 A1 | 4/2008 | Bustos et al. |
| 2008/0108524 A1* | 5/2008 | Willberg ............ C09K 8/035 507/225 |
| 2008/0196896 A1 | 8/2008 | Bustos et al. |
| 2008/0280788 A1 | 11/2008 | Parris et al. |
| 2008/0280790 A1 | 11/2008 | Mirakyan et al. |
| 2012/0285692 A1 | 11/2012 | Potapenko et al. |
| 2013/0081813 A1 | 4/2013 | Liang et al. |
| 2014/0290945 A1 | 10/2014 | Potapenko et al. |
| 2015/0075797 A1* | 3/2015 | Jiang ................. E21B 43/283 166/307 |
| 2015/0240612 A1* | 8/2015 | Fu ..................... C09K 8/62 166/308.1 |
| 2016/0040518 A1* | 2/2016 | Potapenko .......... C09K 8/68 166/308.1 |

\* cited by examiner

WELL TREATMENT

BACKGROUND

The statements in this section merely provide background information related to the present disclosure and may not constitute prior art.

Some embodiments relate to methods applied to a well bore penetrating a subterranean formation.

Hydrocarbons (oil, condensate, and gas) are typically produced from wells that are drilled into the formations containing them. For a variety of reasons, such as inherently low permeability of the reservoirs or damage to the formation caused by drilling and completion of the well, the flow of hydrocarbons into the well is undesirably low. In this case, the well is "stimulated" for example using hydraulic fracturing, chemical (usually acid) stimulation, or a combination of the two (called acid fracturing or fracture acidizing).

Hydraulic fracturing of horizontal wells as well as multi-layered formations frequently requires using diverting techniques in order to enable fracturing redirection between different zones. The list of these diverting methods includes, but not limited to, using mechanical isolation devises such as packers and well bore plugs, setting bridge plugs, pumping ball sealers, pumping slurred benzoic acid flakes and removable/degradable particulates. As well, other treatment may require use of diverting techniques.

Acid fracturing is a widely used technique for increasing the production of oil from a well that penetrates an underground limestone or dolomite hydrocarbon bearing formation. Typically during an acid fracturing treatment, a pad fluid is rapidly injected into the formation so as to create a buildup in wellbore pressure sufficient to overcome compressive stresses and tensile strength of the rock formation. When subjected to a sufficient pressure, the rock fails allowing a crack, also referred to as a fracture, to form in the formation. Continued fluid injection often increases the fracture's length, height and width. Acid is then injected into the fracture and the acid chemically reacts with the face of the fracture. The reaction of the acid with face of the fracture etches the face so that when the fracture closes flow channels are created that extend deep into the formation. If the acid fracturing treatment is properly done, these flow channels remain open when the well is placed back on production, thus increasing the productive capacity of the well.

Limitations in the use of acid fracturing is largely due to, at least:
- The total leakoff of the acid during the treatment keeps on increasing as the fracture propagates and as the walls of the fracture get partially dissolved; as a result it is difficult to maintain a treatment pressure high enough to keep on propagating the fracture and etching the fracture along its length. In the end, a fracture shorter than optimum is generated;
- The stress to which the formation is subject to, tends to close the fracture and generate pinch points. Those pinch points are very detrimental to the production of the well, particularly when they are close to the wellbore. Therefore it is desirable to maximize the amount of etching in the near wellbore region, so that fracture walls remain apart when the fracture eventually closes.

The industry would welcome methods to address the previously mentioned limitations.

SUMMARY

Embodiments describe methods of treating a subterranean formation penetrated by a well bore are disclosed. The methods provide treatment fluids including degradable material.

In embodiments, disclosed are methods of treating a subterranean formation penetrated by a well bore, comprising providing a first treatment fluid comprising an acidic carrier fluid and fibers, pumping the first treatment fluid in the wellbore above the fracturing pressure of the formation, providing a second treatment fluid comprising a non-acidic carrier fluid and blend including a first amount of acid precursor having a first average particle size between about 3 mm and 2 cm and a second amount of acid precursor having a second average size between about 1.6 and 20 times smaller than the first average particle size or a second amount of flakes having a second average size up to 10 times smaller than the first average particle size, creating a plug with the second treatment fluid.

In further aspects, the disclosure relates to systems for wellbore treatment in a wellbore comprising: a first treatment fluid comprising an acidic carrier fluid and fibers, a second treatment fluid comprising a non-acidic carrier fluid and blend including a first amount of acid precursor having a first average particle size between about 3 mm and 2 cm and a second amount of acid precursor having a second average size between about 1.6 and 20 times smaller than the first average particle size or a second amount of flakes having a second average size up to 10 times smaller than the first average particle size.

In yet further aspects, the disclosure pertains to methods of acidizing a subterranean formation penetrated by a well bore, comprising: providing a first treatment fluid comprising an acidic carrier fluid, solid acid precursors and fibers, pumping the first treatment fluid in the wellbore above the fracturing pressure of the formation, providing a second treatment fluid comprising a non-acidic carrier fluid, fibers, and blend including a first amount of solid acid precursor having a first average particle size between about 3 mm and 2 cm and a second amount of solid acid precursor having a second average size between about 1.6 and 20 times smaller than the first average particle size or a second amount of flakes having a second average size up to 10 times smaller than the first average particle size, creating a plug with the second treatment fluid.

DETAILED DESCRIPTION

Figure 1:
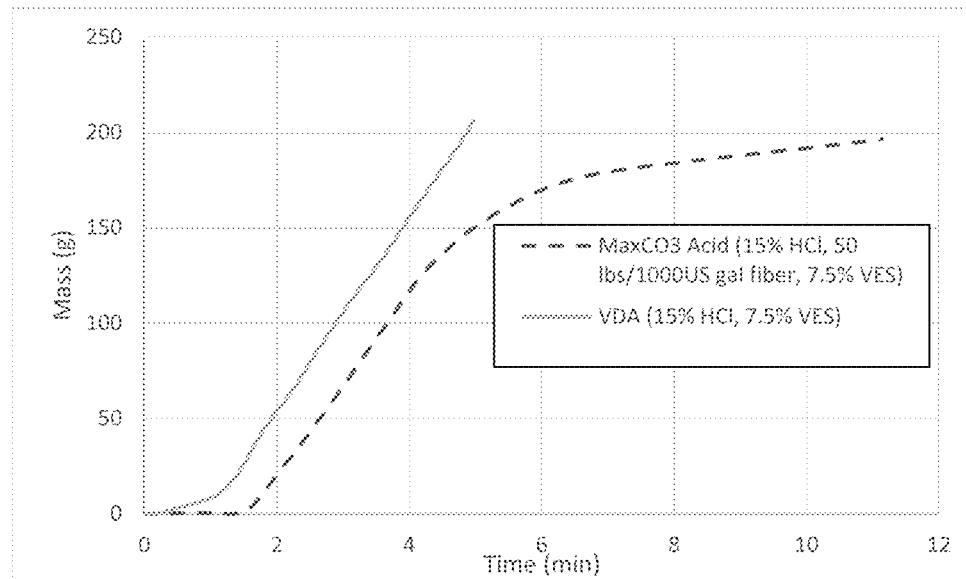
FIG. 1: Comparison of cumulative leakoff mass versus time of Visco elastic diverting acid (VDA) and fiber fluid compared with VDA fluid.

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating some embodiments and should not be construed as a limitation to the scope and applicability. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

The following definitions are provided in order to aid those skilled in the art in understanding the detailed description.

The term "treatment", or "treating", refers to any subterranean operation that uses a fluid in conjunction with a desired function and/or for a desired purpose. The term "treatment", or "treating", does not imply any particular action by the fluid.

The term "fracturing" refers to the process and methods of breaking down a geological formation and creating a fracture, i.e. the rock formation around a well bore, by pumping fluid at very high pressures (pressure above the determined closure pressure of the formation), in order to increase production rates from a hydrocarbon reservoir. The fracturing methods otherwise use conventional techniques known in the art.

The term "particulate" or "particle" refers to a solid 3D object with maximal dimension significantly less than 1 meter. Here "dimension" of the object refers to the distance between two arbitrary parallel planes, each plane touching the surface of the object at at least one point. The maximal dimension refers to the biggest distance existing for the object between any two parallel planes and the minimal dimension refers to the smallest distance existing for the object between any two parallel planes. In some embodiments, the particulates used are with a ratio between the maximal and the minimal dimensions (particle aspect ratio x/y) of less than 5 or even of less than 3.

The term "flake" refers to special type of particulate as defined above. The flake is a solid 3D object having a thickness smaller than its other dimensions, for example its length and width. Flake aspect ratios (diameter/thickness, length/thickness, width/thickness, etc. . . . ) may be in the range of from about 5 to about 50 or more. For the flake, inventors define the flake aspect ratio as the ratio of the length or width to the thickness. Any suitable ratio of length to width may be used.

For the purposes of the disclosure, particles and flakes may be non-homogeneous which shall be understood in the context of the present disclosure as made of at least a continuous phase of degradable material containing a discontinuous phase of a discontinuous material such as a stabilizer or a hydrolysis accelerator. Non-homogeneous in the present disclosure also encompasses composite materials also sometimes referred to as compounded material. The non-homogeneous particles or flakes may be supplemented in the fluid with further homogeneous structure.

The term "particle size", "particulate size" or "flake size" refers to the diameter (D) of the smallest imaginary circumscribed sphere which includes such particulate or flake.

The term "average size" refers to an average size of solids in a group of solids of each type. In each group j of particles or flakes average size can be calculated as mass-weighted value $$L_j = \frac{\sum_{i=1}^{N} l_i m_i}{\sum_{i=1}^{N} m_i}$$

Where N—number of particles or flakes in the group, $l_i$, (i=1 . . . N)—sizes of individual particles or flakes; $m_i$ (i=1 . . . N)—masses of individual particles or flakes.

The term "hole" refers to a 2D object of any geometry defined only by its perimeter. The term "hole diameter" or "hole size" refers to the diameter of the biggest imaginary circle which is included in such hole.

While the embodiments described herewith refer to well treatment it is equally applicable to any well operations where zonal isolation is required such as drilling operations, workover operations etc.

The disclosure pertains to methods to maximize the conductivity of fractures during well treatment such as for example acid fracturing. The fracturing treatment may be pumped in stages which sequentially aim at improving the conductive length of a fracture and the near wellbore conductivity of the fracture.

Without wishing to be bound by any theory, the inventors believe that an engineered combination of materials aiming at synergistically optimizing the acid release in both the near wellbore area and along the fracture length may enable an optimization of the fractures conductivity. The present disclosure aims at such synergistic combinations.

In aspects, the present disclosure aims at methods to address the limitations above. The methods involve using a first treatment fluid comprising fiber as a leak-off agent in an acidic carrier fluid such as, for example, a viscoelastic diverting acid (VDA) to control leak-off and help propagating the fracture. Simultaneously, the methods address the near-wellbore concern by placing a non-acidic carrier fluid comprising acid precursors in the near wellbore region. The acid precursors come in shape and size such that the amount of precursor is maximized, and the acid capacity of the solid acid precursor is maximized to dissolve the maximum of formation in the near wellbore region. To ensure that the solid acid precursor is delivered at high loading downhole, a transport aid may be added at the wellsite. The transport aid may be a fiber.

First Treatment Fluid

As mentioned previously not only the near wellbore area is important to optimize conductivity; indeed, the fracture length treatment shall also be treated with an engineered solution.

During a typical acid fracturing treatment, treating pressure continuously declines at a constant flow rate and eventually falls below a threshold required to propagate the fracture. This decline is mainly caused by acid leaking off into the formation and into natural fractures.

The inventors determined that this may be mitigated by methods for controlling fluid loss from a subterranean formation including preparing a treatment fluid containing a fiber and injecting it into a subterranean formation through a wellbore. In embodiment, the present disclosure provides a method for controlling fluid loss from a subterranean formation including contacting the subterranean formation with a fiber laden treatment fluid.

Conventional fracturing fluid efficiency is dependent on the effectiveness of the filter cake or on the formation and reservoir fluid characteristics. In the case of fiber based leak off control agent, the primary mechanism is to control leak off into infinite permeability void spaces such as wormholes or natural fissures. In this case a fiber network, which is created at the entrance and inside of the wormhole/fissure, acts as a "filter cake," which is also supported by filtrate viscosity buildup (i.e., spent VDA).

FIG. 1 shows a comparison of the "wall building" capability of the first treatment fluid. In the present experiment a fluid comprising a VDA (viscoelastic surfactant and hydrochloric acid), and polylactic acid (PLA) fibers was compared with a VDA without any fibers. The two fluids were pumped through a 0.078 in (2 mm) wide slot, imitating a natural fracture. After some initial spurt loss, the fluid comprising VDA and fiber is capable of building a "fiber cake" at the entrance of the slot as indicated by the "wall building" section of the plot. The fluid solely containing VDA simply leaks through the slot opening at a constant rate throughout much of the experiment and never demonstrates a "wall building" phase. The experiment was done at constant pressure P=20 psi (138 kPa), ambient temperature; the fiber loading in the first fluid was 50 lbm/1,000 galUS (6 kg/m$^3$).

Figure 2:
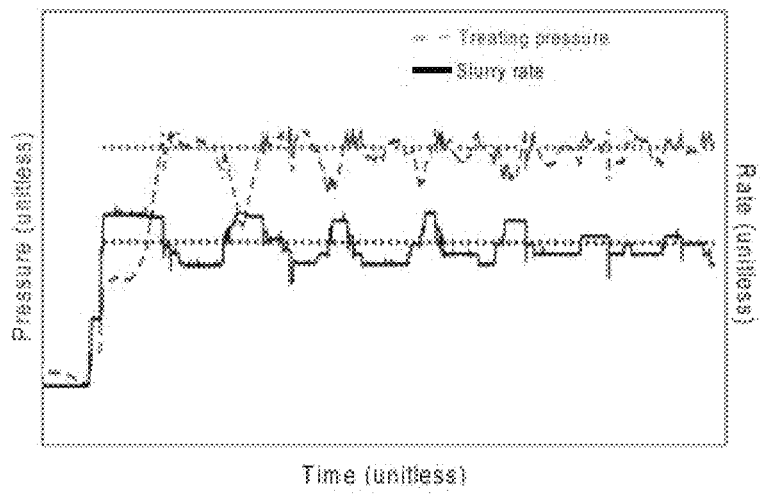
FIG. 2: VDA and fiber fluid treatment plot demonstrating leakoff control.
Figure 3:
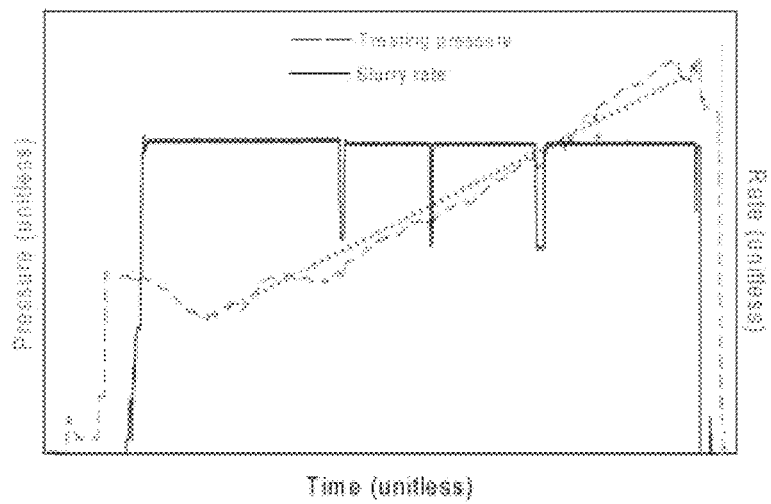
FIG. 3: VDA and fiber fluid treatment plot indicating a positive pressure curve, demonstrating leakoff control.

A significant portion of the injected fluid can be lost during the fracturing process because a large number of fissures and wormholes are encountered. The corresponding increase in fluid loss at an essentially constant net pressure greatly reduces treatment efficiency. Injection pressure during fracturing for these conditions exhibits a continuously decreasing slope on a log-log plot, indicating a progressively increasing rate of fluid loss. While using a fiber based acidic system, there are generally two types of pressure responses during the treatment:

Constant surface pressure, no decline. The fiber based acidic treatment fluid helps to equalize leak off rate with injection rate (FIG. 2);

Surface pressure constantly increases throughout a job. The fiber based acidic treatment fluid helps build up Net pressure (Pnet), decrease injectivity and increase fluid efficiency. (FIG. 3).

As mentioned previously, the carrier fluid for this first treatment fluid may be acidic; then, such fluid may be viscosified in order to optimize the fracture length creation. Suitable carrier fluids include a viscosified acid (e.g. gel-based), or an emulsified acid (e.g. oil outer phase). The gelled acid or emulsified acid may include hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In certain embodiments, the carrier fluid includes a poly-amino-poly-carboxylic acid, and is a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate.

In embodiments, the carrier fluid may exhibit a relatively low viscosity on surface to limit the amount of horsepower required to pump the fluid and its viscosity will increase when encountering friction downhole. This fluids are known as in situ gelled system. With regard to the mixture of fiber and in situ gelled acid, the acid can be either a self-diverting acid (SDA) or a VDA. An example of an SDA system is described in European Patent Application Publication No. 0 278 540 B1, incorporated herein in its entirety by this specific reference. The initially strongly acidic system described in that European Patent Application initially has low viscosity but includes a soluble ferric ion source and a polymeric gelling agent that is cross-linked by ferric ions at a pH of about 2 or greater but not at lower pH's. The polymer is, for example, ethanaminium,N,N,N-trimethyl-methyl-oxo-chloride copolymer with propenamide (an anionic polyacrylamide) at temperatures below about 93° C.; or cationic polyacrylamide copolymer at temperatures above about 93° C. This polymer is not cross-linked by ferrous ions. Therefore, the system includes a reducing agent that reduces ferric ions to ferrous ions, but only at a pH above about 3 to 3.5. Consequently, as the acid spends, for example in a wormhole or fracture, and the pH increases to about 2 or greater, the polymer cross-links, and a very viscous gel forms that inhibits further flow of fresh acid into the wormhole or fracture. As the acid spends further (after the treatment) and the pH continues to rise, the reducing agent converts the ferric ions to ferrous ions and the gel reverts to a more water-like state. Hydrazine salts and hydroxylamine salts are most commonly the reducing agents.

Viscoelastic diverting acids (VDA's), comprised of a gelling agent, or primary surfactant, for example certain surfactants such as betaines, optionally a pH-sensitive co-surfactant and/or alcohol, and an acid, are described, for instance, in U.S. Pat. No. 6,667,280, and U.S. Patent Application Publication No. 2003-0119680, both of which are hereby incorporated herein in their entirety by these specific references thereto. The acid may be a mineral acid (for instance, hydrochloric or hydrofluoric acid) or an organic acid (acetic or formic acid, for instance). The co-surfactant is preferably a dodecylbenzene sulfonic acid or salt, and the gelling agent is preferably a zwitterionic surfactant, more preferably a betaine. Such systems are initially of very low viscosity, and therefore easily pumped, with low friction pressures and insensitive to shear, but once placed in the formation, the spending of the acid by reaction with minerals in the formation triggers an increase in viscosity, plugging flow channels such that, as additional VDA or formation treatment fluid is pumped into the formation, it is diverted away from the gel towards regions of lower permeability.

Examples of zwitterionic surfactants useful as components of VDA's have the following amide structure:

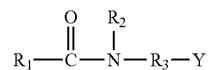

in which R1 is a hydrocarbyl group that may be branched or straight chained, aromatic, aliphatic, or olefinic and has from about 14 to about 26 carbon atoms and may contain an amine; R2 is hydrogen or an alkyl group having from 1 to about 4 carbon atoms; R3 is a hydrocarbyl group having from 1 to about 5 carbon atoms; and Y is an electron withdrawing group. Preferably the electron withdrawing group is a quaternary amine, sulfonate, carboxylic acid, or amine oxide. VDA's may also include additives such as those known in the art, for instance, corrosion inhibitors, iron reducing or control agents, and chelating agents.

Two examples of zwitterionic surfactants suitable for forming VDA's are betaines called, respectively, BET-O and BET-E. One is designated BET-O-30 because, as obtained from the supplier (Rhodia, Inc., Cranbury, N.J., U.S.A.), it is called Mirataine BET-O-30 because it contains an oleyl acid amide group (including a C17H33 tail group) and contains about 30% active surfactant; the remainder is substantially water, a small amount of sodium chloride, glycerol and propane-1,2-diol. An analogous material, BET-E-40, is also available from Rhodia and contains a erucic acid amide group (including a C21H41 tail group) and is 40% active ingredient with the remainder substantially water, a small amount of sodium chloride, and isopropanol. A generic betaine surfactant is shown below. These betaine surfactants are referred to herein as BET-O-30 and BET-E-40 (and generically as "BET surfactants"). The surfactants are supplied in this form, with an alcohol and a glycol, to aid in solubilizing the surfactant in water at high concentration, and to maintain it as a homogeneous fluid at low temperatures. However, the surfactants are also used in other forms. BET surfactants, and others, are described in U.S. Pat. No. 6,258,859. The generic chemical structure of these betaines is:

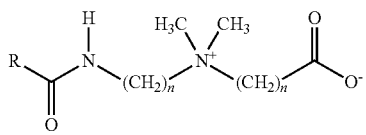

in which R is a hydrocarbyl group that may be branched or straight chained, aromatic, aliphatic or olefinic and has from about 14 to about 26 carbon atoms and may contain an amine; n=about 2 to about 4; and p=1 to about 5, and mixtures of these compounds. Most preferably, the surfactant is the betaine in which R is the straight-chained olefinic group $C_{17}H_{33}$ (BET-O-30) or the straight-chained olefinic group $C_{21}H_{41}$ (BET-E-40), and n=3 and p=1.

These betaine surfactants can form aqueous, viscous high-temperature gels over a broad range of electrolyte concentration; they form gels with no added salt or even in heavy brines. The fluids can generally be prepared, for example, with municipal water, lake or creek water, or seawater. Co-surfactants may be useful in extending the brine tolerance, and to increase the gel strength and to reduce the shear sensitivity of the fluid, especially for BET-O. An example of such a co-surfactant is sodium dodecylbenzene sulfonate (SDBS). For a given surfactant and conditions (especially the temperature and the time for which a suitable viscosity is required), the salinity and the presence and nature of the co-surfactants can be adjusted in accordance with parameters known to those skilled in the art to ensure that the gel has the desired stability. Other additives, such as compatible corrosion inhibitors, stabilizers, shear stability enhancers, shear recovery additives, etc. may be added.

Other examples of suitable surfactants from which suitable VDA fluid systems may be made include other surfactants described in U.S. Pat. No. 6,667,280, for example amidoalkylamine oxides, such as erucylamidopropyl amine oxide.

Cationic surfactants that may be utilized in a VDA in accordance with the method of the present invention are quaternary amines such as erucyl bis-(2-hydroxyethyl) methyl ammonium chloride (EHAC) and other surfactants as listed in U.S. Pat. Nos. 5,258,137, 5,551,516, and 5,924,295, all of which are hereby incorporated herein in their entireties by this specific reference. Cationic VDA's are described in U.S. Patent Application Publication No. 2005-0126786, also incorporated herein in its entirety by this specific reference. Such surfactants are mixed with a lower molecular weight alcohol such as isopropanol and/or propylene glycol and a water soluble salt, and may also include a co-surfactant, and additives such as those known in the art, for instance, corrosion inhibitors, iron reducing or control agents, and chelating agents.

The acid component of the SDA or VDA into which the fibers are mixed can be any organic or inorganic acid; by non-limiting example, mineral acids such as hydrochloric, hydrofluoric, fluoroboric, sulfuric, phosphoric, or nitric acid, or organic acids such as maleic, citric, acetic, or formic acid, and mixtures thereof. The rheology of the SDA or VDA is affected primarily by acid strength, not by the type of anion.

The first fluid also includes fibers which are the primary leak off control agent, the compositions of such fibers will be disclosed in details later on. The fiber maybe added to the first fluid in a proportion ranging from about 1.2 g/L (about 10 ppt (pounds per thousand gallons)) to about 18 g/L (about 150 ppt), for example from about 6 g/L (about 50 ppt) to about 8.4 g/L (about 70 ppt). The proportion and physical dimensions of the fiber, and the particular fiber utilized, depend on a number of variables, including the characteristics of the treatment fluid or in situ gelled acid, and the chemical and physical characteristics of the formation. For instance, longer fibers may be utilized in formations that are highly fractured and/or in which the naturally occurring fractures are quite large, and it may be advantageous to utilize higher concentrations of such fibers for use in such formations.

The first fluid may also include degradable particulates. Without wishing to be bound by any theory, the inventors believe that including degradable particulates may improve the acid concentration in the fracture while degrading thus optimizing etching of the fracture and thus conductivity. The degradable particulates will also be described here under. The particles in the first fluid may not contain any large particles size and thus the particles in the first fluid may have a size below 3 mm in order to be able to penetrate through the fracture length in the formation.

In embodiments, the fibers in the first fluid are degradable fibers made of acid precursors, when the fluid is place and such fiber degrade, an acid is released optimizing the acid treatment all along the length of the fracture. When degradable particles of an acid precursors are added to the first treatment fluid, the concentration of acid generated during degradation of both the particles and the fibers makes the acid treatment even more efficient.

Second Treatment Fluid

In the present context the near wellbore is the portion of formation within a distance of 30 feet, or 20 feet or even 3 feet from the wellbore. In order to maximize the amount of rock dissolution in said near wellbore region, a solid acid precursor may be placed within such distance. Solid acid precursors come with a finite acid capacity.

One of the challenge is to optimize the quantity of acid that can be release at the specific near wellbore location at a defined time. The industry typically used liquid acid, such as acetic acid or formic acid, in the fracturing fluid in order to dissolve calcite downhole. One of the drawback is that the acid reacts immediately with the formation and it becomes practically impossible to achieved long fractures without damaging too much the near wellbore area.

In embodiments the acid precursor is a solid acid precursor, it may also be referred to in the present disclosure as degradable particles or particulates or flakes.

Figure 4:
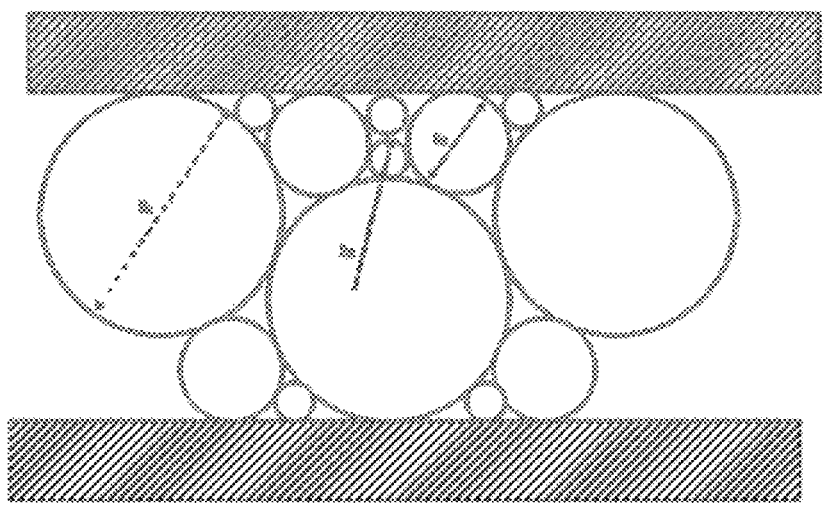
FIG. 4 shows an illustration of particles size distribution required for reducing plug permeability when the size of the largest particles in the blend is comparable with the size of the void to plug.

The inventors have determined that it would be advantageous to be able to treat the length of the fracture while not damaging the near wellbore area from the beginning of the treatment while still being able to treat said area at a later stage thus optimizing the conductivity. A method disclosed comprises placing an acid precursor in the near wellbore area. Said precursor may stay in place until starting degrading thus releasing acid and cleaning the near wellbore area. However, this pose other challenges since placing solids also means that a limited quantity of material can be placed in the wellbore since the classical leak off phenomena observed with liquid would not be observed. The inventors have thus determine that with a careful engineering of the particle volume fraction, it was possible to maximize the amount of solid acid precursor. Methods for maximizing the amount of acid release in the near wellbore are disclosed, the methods comprise shaping the solid acid precursor such that the diameter of a first large particle matches or is slightly lower than the size of the fracture (so that the particle can penetrate to a short distance in the formation). The selection of the size of a second amount of particulates is dependent upon maximizing or optimizing a packed volume fraction (PVF) of the mixture of the first amount of particulates and the second amount of particulates. The packed volume fraction or packing volume fraction (PVF) is the fraction of solid content volume to the total volume content. The particles size distribution required for maximizing PVF in narrow slot may be different from the particles size distribution required for maximizing PVF in a continuum system, this can be seen in FIG. 4.

The determination of the optimal particles size in the blend may be made as described in US patent Application No 2012-0285692 incorporated herein by reference in its entirety.

The particle(s) and the flake(s) size are chosen so the size of the largest particles or flakes is slightly smaller than the diameter of the perforation holes in casing and larger than the average width of the voids behind casing (perforation tunnels, fractures or wormholes). By perforation hole, we mean any type of hole present in the casing. This hole can be a perforation, a jetted hole, hole from a slotted liner, port or any opening in a completion tool, casing fluid exit point. According to a further embodiment, the size of particles or flakes in the blend is designed for reducing permeability of the plugs in the narrow voids behind casing (perforation tunnels, fractures or wormholes). In general the particle or flake used will have an average particle size of less than several centimeters, such as less than 2 cm, or less than 1 cm. In one embodiment, some particle or flake will have an average particle size of from about 0.04 mm to about 4.76 mm (about 325 to about 4 U.S. mesh), or from about 0.10 mm to about 4.76 mm (about 140 to about 4 U. S. mesh), or from about 0.15 mm to about 3.36 mm (about 100 to about 6 U. S. mesh) or from about 2 mm to about 12 mm.

According to embodiments, the particles blend or the particles/flakes blend composition contains particles or flakes with different particles/flakes size distribution. In one embodiment, the composition comprises particulate materials with defined particles size distribution. On example of realization is disclosed in U.S. Pat. No. 7,784,541, herewith incorporated by reference in its entirety.

In certain embodiments, the selection of the size for the first amount of particulates is dependent upon the characteristics of the perforated hole as described above: the size of the largest particles or flakes is slightly smaller than the diameter of the perforation holes in casing. In certain further embodiments, the selection of the size of the first amount of particulates is dependent upon the void behind casing: the size of the particles is larger than the average width of the voids behind casing (perforation tunnels, fractures or wormholes). In certain further embodiments, the selection of the size for the first amount of particulates is dependent upon the characteristics of the perforated hole and the void behind casing: the size of the largest particles or flakes is slightly smaller than the diameter of the perforation holes in casing and larger than the average width of the voids behind casing (perforation tunnels, fractures or wormholes). In certain further embodiments, the selection of the size for the first amount of particulates is dependent upon the characteristics of the desired fluid loss characteristics of the first amount of particulates as a fluid loss agent, the size of pores in the formation, and/or the commercially available sizes of particulates of the type comprising the first amount of particulates. The first average particle size is between about 100 micrometers and 2 cm, or between about 100 micrometers and 1 cm or between about 400 micrometers and 1000 micrometers, or between about 3000 micrometers and 10000 micrometers, or between about 6 millimeters and 10 millimeters, or between about 6 millimeters and 8 millimeters. Also in some embodiments, the same chemistry can be used for the first average particle size.

In certain embodiments, the selection of the size of the second amount of particulates is dependent upon maximizing or optimizing a packed volume fraction (PVF) of the mixture of the first amount of particulates and the second amount of particulates. The packed volume fraction or packing volume fraction (PVF) is the fraction of solid content volume to the total volume content. The particles size distribution required for maximizing PVF in narrow slot may be different from the particles size distribution required for maximizing PVF in a continuum system. Therefore, in certain embodiments, the selection of the size of the second amount of particulates is dependent upon maximizing or optimizing a packed volume fraction (PVF) of the mixture of the first amount of particulates and the second amount of particulates in narrow voids between 2 mm and 2 cm. In certain embodiments, the selection of the size of the second amount of particulates is dependent upon maximizing or optimizing a packed volume fraction (PVF) of the mixture of the first amount of particulates and the second amount of particulates in a fracture or slot with width of less than 20 mm. A second average particle size of between about two to ten times smaller than the first amount of particulates contributes to maximizing the PVF of the mixture or the mixture placed in the void to plug, or the mixture placed in a fracture or slot with width of less than 20 mm, but a size between about three to twenty times smaller, and in certain embodiments between about three to fifteen times smaller, and in certain embodiments between about three to ten times smaller will provide a sufficient PVF for most storable compositions. Further, the selection of the size of the second amount of particulates is dependent upon the composition and commercial availability of particulates of the type comprising the second amount of particulates. In certain embodiments, the particulates combine to have a PVF above 0.74 or 0.75 or above 0.80. In certain further embodiments the particulates may have a much higher PVF approaching 0.95.

In certain embodiments, the selection of the size for the second amount of flakes is dependent upon the characteristics of the desired fluid loss characteristics of the second amount of flakes as a fluid loss agent, the size of pores in the formation, and/or the commercially available sizes of flakes of the type comprising the second amount of flakes. The flake size is in the range of 10-100% of the size of the first amount of particulate, more preferably 20-80% of the size of the first amount of particulate.

In certain embodiments, the selection of the size of the second amount of flakes is dependent upon maximizing or optimizing a packed volume fraction (PVF) of the mixture of the first amount of particulates and the second amount of flakes. The packed volume fraction or packing volume fraction (PVF) is the fraction of solid content volume to the total volume content. In certain embodiments, the selection of the size of the second amount of flakes is dependent upon maximizing or optimizing a packed volume fraction (PVF) of the mixture of the first amount of particulates and the second amount of flakes in narrow voids between 3 mm and 2 cm. In certain embodiments, the selection of the size of the second amount of flakes is dependent upon maximizing or optimizing a packed volume fraction (PVF) of the mixture of the first amount of particulates and the second amount of flakes in a fracture or slot with width of less than 20 mm. In certain embodiments, PVF may not necessarily the criterion for selecting the size of flakes.

In certain further embodiments, the selection of the size for the second amount of particulates/flakes is dependent upon the characteristics of the void behind casing and upon maximizing a packed volume fraction (PVF) of the mixture of the first amount of particulates and the second amount of particulates/flakes as discussed above. Also in some embodiments, the same chemistry can be used for the second average particle/flake size. Also in some embodiments, different chemistry can be used for the same second average particle size: e.g. in the second average particle size, half of the amount is PLA and the other half is PGA.

In certain further embodiments, the composition further includes a third amount of particulates/flakes having a third average particle size that is smaller than the second average particle/flake size. In certain further embodiments, the composition may have a fourth or a fifth amount of particles/flakes. Also in some embodiments, the same chemistry can be used for the third, fourth, or fifth average particle/flake size. Also in some embodiments, different chemistry can be used for the same third average particle size: e.g. in the third average particle size, half of the amount is PLA and the other half is PGA. For the purposes of enhancing the PVF of the composition, more than three or four particles sizes will not typically be required. However, additional particles may be added for other reasons, such as the chemical composition of the additional particles, the ease of manufacturing certain materials into the same particles versus into separate particles, the commercial availability of particles having certain properties, and other reasons understood in the art.

In embodiments, the particulates combine to have a PVF above 0.74 or 0.75 or above 0.80. In certain further embodiments the particulates may have a much higher PVF approaching 0.95. Such high PVF will in enable maximizing the concentration of acid precursor in the near wellbore region.

The carrier fluid may be water: fresh water, produced water, seawater. Other non-limiting examples of carrier fluids include hydratable gels (e.g. guars, polysaccharides, xanthan, hydroxy-ethyl-cellulose, etc.), a cross-linked hydratable gel, an energized fluid (e.g. an N2 or CO2 based foam), and an oil-based fluid including a gelled, foamed, or otherwise viscosified oil. Additionally, the carrier fluid may be a brine, and/or may include a brine.

In certain further embodiments, the second treatment fluid carrier fluid contains a viscosifying agent. The viscosifying agent may be any crosslinked polymers. The polymer viscosifier can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers effective as viscosifying agent include polyvinyl polymers, polymethacrylamides, cellulose ethers, lignosulfonates, and ammonium, alkali metal, and alkaline earth salts thereof. More specific examples of other typical water soluble polymers are methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

Cellulose derivatives are used to a smaller extent, such as hydroxyethylcellulose (HEC) or hydroxypropylcellulose (HPC), carboxymethylhydroxyethylcellulose (CMHEC) and carboxymethycellulose (CMC), with or without crosslinkers. Xanthan, diutan, and scleroglucan, three biopolymers, have been shown to have excellent particulate-suspension ability even though they are more expensive than guar derivatives and therefore have been used less frequently, unless they can be used at lower concentrations.

In other embodiments, the viscosifying agent is made from a crosslinkable, hydratable polymer and a delayed crosslinking agent, wherein the crosslinking agent comprises a complex comprising a metal and a ligand. Also the crosslinked polymer can be made from a polymer comprising pendant ionic moieties, a surfactant comprising oppositely charged moieties, a clay stabilizer, a borate source, and a metal crosslinker. Said embodiments are described in U.S. Patent Publications US2008-0280790 and US2008-0280788 respectively, each of which are incorporated herein by reference.

The viscosifying agent may be a viscoelastic surfactant (VES). The VES may be selected from the group consisting of cationic, anionic, zwitterionic, amphoteric, nonionic and combinations thereof. Some non-limiting examples are those cited in U.S. Pat. No. 6,435,277 (Qu et al.) and U.S. Pat. No. 6,703,352 (Dahayanake et al.), each of which are incorporated herein by reference. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

In general, particularly suitable zwitterionic surfactants have the formula:

$$RCONH—(CH_2)^a(CH_2CH_2O)^m(CH_2)^b—N+(CH_3)2-(CH_2)^{a'}(CH_2CH_2O)^{m'}(CH_2)^{b'}COO—$$

in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH2CH2$. In some embodiments, a zwitterionic surfactants of the family of betaine is used.

Exemplary cationic viscoelastic surfactants include the amine salts and quaternary amine salts disclosed in U.S. Pat. Nos. 5,979,557, and 6,435,277 which are hereby incorporated by reference. Examples of suitable cationic viscoelastic surfactants include cationic surfactants having the structure:

$$R1N+(R2)(R3)(R4)X—$$

in which R1 has from about 14 to about 26 carbon atoms and may be branched or straight chained, aromatic, saturated or unsaturated, and may contain a carbonyl, an amide, a retroamide, an imide, a urea, or an amine; R2, R3, and R4 are each independently hydrogen or a C1 to about C6 aliphatic group which may be the same or different, branched or straight chained, saturated or unsaturated and one or more than one of which may be substituted with a group that renders the R2, R3, and R4 group more hydrophilic; the R2, R3 and R4 groups may be incorporated into a heterocyclic 5- or 6-member ring structure which includes the nitrogen atom; the R2, R3 and R4 groups may be the same or different; R1, R2, R3 and/or R4 may contain one or more ethylene oxide and/or propylene oxide units; and X— is an anion. Mixtures of such compounds are also suitable. As a further example, R1 is from about 18 to about 22 carbon atoms and may contain a carbonyl, an amide, or an amine, and R2, R3, and R4 are the same as one another and contain from 1 to about 3 carbon atoms.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Pat. Nos. 6,239,183; 6,506,710; 7,060,661; 7,303,018; and 7,510,009 for example amidoamine oxides. These references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The viscoelastic surfactant system may also be based upon any suitable anionic surfactant. In some embodiments, the anionic surfactant is an alkyl sarcosinate. The alkyl sarcosinate can generally have any number of carbon atoms. Alkyl sarcosinates can have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

$$R1CON(R2)CH2X$$

wherein R1 is a hydrophobic chain having about 12 to about 24 carbon atoms, R2 is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

Fibers may be included in the second treatment fluid where they are mainly used to carry particles. The fibers suitable for the second carrier fluid will be disclosed here under. The fiber concentrations in the second fluid will typically range from 3.6 g/L (30 ppt) to 7.2 g/L (60 ppt).

The second fluid as described may also be used as a diverting agent and promote the re-direction of the subsequent train of fluids to another region of the wellbore, further contributing to improving the quality of the stimulation of the wellbore. In this configuration the first fluid will be pumped above the fracturing pressure of the formation to breakdown the rock and create a long fracture; then, the second treatment fluid would be pumped down in order to create a diverting plug in the near wellbore area; another step of pumping the first treatment fluid will be achieved to fracture the rock in another location and subsequent operations will be repeated in order to maximize the wellbore coverage and efficiency. Once the fracturing operations are finished, the wellbore plug will degrade thus releasing the acid and clean the near wellbore area thus optimizing the conductivity.

The second fluid may not be acidic in order to not damage the near wellbore area, indeed, the first fluid that is used for creating sufficient fracture length may need time to be efficient and the near wellbore area being "plugged" will enable this phenomenon, when the downhole conditions trigger the degradation of the first fluid, the flowback of the acidic (first treatment fluid) in conjunction with the degradation of the acid precursors in the non-acidic treatment fluid (second fluid) will clean the both the fracture length and the near wellbore area thus maximizing the conductivity.

Methods of wellsite and downhole delivery of the composition are the same as for existing particulate diverting materials. Typically such particulate materials are introduced in the pumping fluid and then displaced into the perforations at high pumping rate. The list of injecting equipment may include various dry additive systems, flow-through blenders etc. In one embodiment the blends of particles may be batch missed and then introduced into the treating fluid in slurred form. Simple flow-through injecting apparatuses may also be used. In one embodiment the composition may be delivered downhole in a bailer or in a tool comprising bailer and a perforation gun as described in US Patent Application 2008/0196896 incorporated herewith by reference. Other way of delivery of the composition can be envisioned for example with a wireline tool, a drill string, through a slickline, with a coil tubing or microcoil, with a downhole tool or any type of other device introduced downhole and able to deliver the composition at a defined location. A microcoil or Microhole Coiled Tubing Drilling Rig (MCTR) is a tool capable of performing an entire "grass-roots" operation in the 0-5000 ft true vertical depth range including drilling and casing surface, intermediate, and production and liner holes.

As soon as the volume of diverting blend required for treatment diversion is relatively low there is a risk that particles in the blend will be separated during pumping through the well bore. It may result in poorer treatment diversion because of forming plugs of higher permeability than expected. To avoid this situation long slugs with low concentration of diverting blends may be introduced in the treating fluid for minimizing the risk of particles separation in the main amount of the pumped blend. In one other embodiment, to avoid this situation diverting blends may be pumped in long slugs at low concentrations which will make volume of the diverting stage comparable with the volume of the well bore. For example for wells with well bore volume of 200 bbl (32 m$^3$) the volumes of the diverting stage that minimizes the risk of particles separation may be in the range of 20-100 bbl (3.2-16 m3). For 5-25 kg of diverting material it corresponds to the range of concentrations of 0.3-8 kg/m$^3$.

Compositions

Even if the first and second fluids have specific features to achieve their goals, some of the chemicals involved in both fluid may share similar properties. Material that can be used indifferently in both treatment fluid will be disclosed here after.

Non-limiting examples of degradable materials that may be used in both treatment fluids include certain polymer materials that are capable of generating acids upon degradation. These polymer materials may herein be referred to as "polymeric acid precursors." These materials are typically solids at room temperature. The polymeric acid precursor materials include the polymers and oligomers that hydrolyze or degrade in certain chemical environments under known and controllable conditions of temperature, time and pH to release organic acid molecules that may be referred to as "monomeric organic acids." As used herein, the expression "monomeric organic acid" or "monomeric acid" may also include dimeric acid or acid with a small number of linked monomer units that function similarly to monomer acids composed of only one monomer unit.

Polymer materials may include those polyesters obtained by polymerization of hydroxycarboxylic acids, such as the aliphatic polyester of lactic acid, referred to as polylactic acid; glycolic acid, referred to as polyglycolic acid; 3-hydroxbutyric acid, referred to as polyhydroxybutyrate; 2-hydroxyvaleric acid, referred to as polyhydroxyvalerate; epsilon caprolactone, referred to as polyepsilon caprolactone or polyprolactone; the polyesters obtained by esterification of hydroxyl aminoacids such as serine, threonine and tyrosine; and the copolymers obtained by mixtures of the monomers listed above. A general structure for the above-described homopolyesters is:

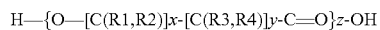

where,

R1, R2, R3, R4 is either H, linear alkyl, such as CH3, CH2CH3 (CH2)nCH3, branched alkyl, aryl, alkylaryl, a functional alkyl group (bearing carboxylic acid groups, amino groups, hydroxyl groups, thiol groups, or others) or a functional aryl group (bearing carboxylic acid groups, amino groups, hydroxyl groups, thiol groups, or others);

x is an integer between 1 and 11;
y is an integer between 0 and 10; and
z is an integer between 2 and 50,000.

In the appropriate conditions (pH, temperature, water content) polyesters like those described herein can hydrolyze and degrade to yield hydroxycarboxylic acid and compounds that pertain to those acids referred to in the foregoing as "monomeric acids."

One example of a suitable polymeric acid precursor, as mentioned above, is the polymer of lactic acid, sometimes called polylactic acid, "PLA", polylactate or polylactide. Lactic acid is a chiral molecule and has two optical isomers. These are D-lactic acid and L-lactic acid. The poly(L-lactic acid) and poly(D-lactic acid) forms are generally crystalline in nature. Polymerization of a mixture of the L- and D-lactic acids to poly(DL-lactic acid) results in a polymer that is more amorphous in nature. The polymers described herein are essentially linear. The degree of polymerization of the linear polylactic acid can vary from a few units (2-10 units) (oligomers) to several thousands (e.g. 2000-5000). Cyclic structures may also be used. The degree of polymerization of these cyclic structures may be smaller than that of the linear polymers. These cyclic structures may include cyclic dimers.

Another example is the polymer of glycolic acid (hydroxyacetic acid), also known as polyglycolic acid ("PGA"), or polyglycolide. Other materials suitable as polymeric acid precursors are all those polymers of glycolic acid with itself or other hydroxy-acid-containing moieties, as described in U.S. Pat. Nos. 4,848,467; 4,957,165; and 4,986,355, which are herein incorporated by reference.

The polylactic acid and polyglycolic acid may each be used as homopolymers, which may contain less than about 0.1% by weight of other comonomers. As used with reference to polylactic acid, "homopolymer(s)" is meant to include polymers of D-lactic acid, L-lactic acid and/or mixtures or copolymers of pure D-lactic acid and pure L-lactic acid. Additionally, random copolymers of lactic acid and glycolic acid and block copolymers of polylactic acid and polyglycolic acid may be used. Combinations of the described homopolymers and/or the above-described copolymers may also be used.

Other examples of polyesters of hydroxycarboxylic acids that may be used as polymeric acid precursors are the polymers of hydroxyvaleric acid (polyhydroxyvalerate), hydroxybutyric acid (polyhydroxybutyrate) and their copolymers with other hydroxycarboxylic acids. Polyesters resulting from the ring opening polymerization of lactones such as epsilon caprolactone (polyepsiloncaprolactone) or copolymers of hydroxyacids and lactones may also be used as polymeric acid precursors.

Polyesters obtained by esterification of other hydroxyl-containing acid-containing monomers such as hydroxyaminoacids may be used as polymeric acid precursors. Naturally occurring aminoacids are L-aminoacids. Among the 20 most common aminoacids the three that contain hydroxyl groups are L-serine, L-threonine, and L-tyrosine. These aminoacids may be polymerized to yield polyesters at the appropriate temperature and using appropriate catalysts by reaction of their alcohol and their carboxylic acid group. D-aminoacids are less common in nature, but their polymers and copolymers may also be used as polymeric acid precursors.

NatureWorks, LLC, Minnetonka, Minn., USA, produces solid cyclic lactic acid dimer called "lactide" and from it produces lactic acid polymers, or polylactates, with varying molecular weights and degrees of crystallinity, under the generic trade name NATUREWORKS™ PLA. The PLA's currently available from NatureWorks, LLC have number averaged molecular weights (Mn) of up to about 100,000 and weight averaged molecular weights (Mw) of up to about 200,000, although any polylactide (made by any process by any manufacturer) may be used. Those available from NatureWorks, LLC typically have crystalline melt temperatures of from about 120 to about 170° C., but others are obtainable. Poly(d,l-lactide) at various molecular weights is also commercially available from Bio-Invigor, Beijing and Taiwan. Bio-Invigor also supplies polyglycolic acid (also known as polyglycolide) and various copolymers of lactic acid and glycolic acid, often called "polyglactin" or poly (lactide-co-glycolide).

The extent of the crystallinity can be controlled by the manufacturing method for homopolymers and by the manufacturing method and the ratio and distribution of lactide and glycolide for the copolymers. Additionally, the chirality of the lactic acid used also affects the crystallinity of the polymer. Polyglycolide can be made in a porous form. Some of the polymers dissolve very slowly in water before they hydrolyze.

Amorphous polymers may be useful in certain applications. An example of a commercially available amorphous polymer is that available as NATUREWORKS 4060D PLA, available from NatureWorks, LLC, which is a poly(DL-lactic acid) and contains approximately 12% by weight of D-lactic acid and has a number average molecular weight (Mn) of approximately 98,000 g/mol and a weight average molecular weight (Mw) of approximately 186,000 g/mol.

Other polymer materials that may be useful are the polyesters obtained by polymerization of polycarboxylic acid derivatives, such as dicarboxylic acids derivatives with polyhydroxy containing compounds, in particular dihydroxy containing compounds. Polycarboxylic acid derivatives that may be used are those dicarboxylic acids such as oxalic acid, propanedioic acid, malonic acid, fumaric acid, maleic acid, succinic acid, glutaric acid, pentanedioic acid, adipic acid, phthalic acid, isophthalic acid, terphthalic acid, aspartic acid, or glutamic acid; polycarboxylic acid derivatives such as citric acid, poly and oligo acrylic acid and methacrylic acid copolymers; dicarboxylic acid anhydrides, such as, maleic anhydride, succinic anhydride, pentanedioic acid anhydride, adipic anhydride, phthalic anhydride; dicarboxylic acid halides, primarily dicarboxylic acid chlorides, such as propanedioic acil chloride, malonyl chloride, fumaroil chloride, maleyl chloride, succinyl chloride, glutaroyl chloride, adipoil chloride, phthaloil chloride. Useful polyhydroxy containing compounds are those dihydroxy compounds such as ethylene glycol, propylene glycol, 1,4 butanediol, 1,5 pentanediol, 1,6 hexanediol, hydroquinone, resorcinol, bisphenols such as bisphenol acetone (bisphenol A) or bisphenol formaldehyde (bisphenol F); polyols such as glycerol. When both a dicarboxylic acid derivative and a dihydroxy compound are used, a linear polyester results. It is understood that when one type of dicaboxylic acid is used, and one type of dihydroxy compound is used, a linear homopolyester is obtained. When multiple types of polycarboxylic acids and/or polyhydroxy containing monomer are used copolyesters are obtained. According to the Flory Stockmayer kinetics, the "functionality" of the polycarboxylic acid monomers (number of acid groups per monomer molecule) and the "functionality" of the polyhydroxy containing monomers (number of hydroxyl groups per monomer molecule) and their respective concentrations, will determine the configuration of the polymer (linear, branched, star, slightly crosslinked or fully crosslinked). All these configurations can be hydrolyzed or "degraded" to carboxylic acid monomers, and therefore can be considered as polymeric acid precursors. As a particular case example, not willing to be comprehensive of all the possible polyester structures one can consider, but just to provide an indication of the general structure of the most simple case one can encounter, the general structure for the linear homopolyesters is:

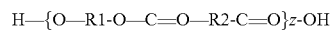

where,

R1 and R2, are linear alkyl, branched alkyl, aryl, alkylaryl groups; and z is an integer between 2 and 50,000.

Other examples of suitable polymeric acid precursors are the polyesters derived from phtalic acid derivatives such as polyethylenetherephthalate (PET), polybutylentetherephthalate (PBT), polyethylenenaphthalate (PEN), and the like.

In the appropriate conditions (pH, temperature, water content) polyesters like those described herein can "hydrolyze" and "degrade" to yield polycarboxylic acids and polyhydroxy compounds, irrespective of the original polyester being synthesized from either one of the polycarboxylic acid derivatives listed above. The polycarboxylic acid compounds the polymer degradation process will yield are also considered monomeric acids.

Other examples of polymer materials that may be used are those obtained by the polymerization of sulfonic acid derivatives with polyhydroxy compounds, such as polysulphones or phosphoric acid derivatives with polyhydroxy compounds, such as polyphosphates.

Such solid polymeric acid precursor material may be capable of undergoing an irreversible breakdown into fundamental acid products downhole. As referred to herein, the term "irreversible" will be understood to mean that the solid polymeric acid precursor material, once broken downhole, should not reconstitute while downhole, e.g., the material should break down in situ but should not reconstitute in situ. The term "break down" refers to both the two relatively extreme cases of hydrolytic degradation that the solid polymeric acid precursor material may undergo, e.g., bulk erosion and surface erosion, and any stage of degradation in between these two. This degradation can be a result of, inter alia, a chemical reaction. The rate at which the chemical reaction takes place may depend on, inter alia, the chemicals added, temperature and time. The breakdown of solid polymeric acid precursor materials may or may not depend, at least in part, on its structure. For instance, the presence of hydrolyzable and/or oxidizable linkages in the backbone often yields a material that will break down as described herein. The rates at which such polymers break down are dependent on factors such as, but not limited to, the type of repetitive unit, composition, sequence, length, molecular geometry, molecular weight, morphology (e.g., crystallinity, size of spherulites, and orientation), hydrophilicity, hydrophobicity, surface area, and additives. The manner in which the polymer breaks down also may be affected by the environment to which the polymer is exposed, e.g., temperature, presence of moisture, oxygen, microorganisms, enzymes, pH, and the like.

Some suitable examples of solid polymeric acid precursor material that may be used include, but are not limited to, those described in the publication of Advances in Polymer Science, Vol. 157 entitled "Degradable Aliphatic Polyesters," edited by A. C. Albertsson, pages 1-138. Examples of polyesters that may be used include homopolymers, random, block, graft, and star- and hyper-branched aliphatic polyesters.

Another class of suitable solid polymeric acid precursor material that may be used includes polyamides and polyimides. Such polymers may comprise hydrolyzable groups in the polymer backbone that may hydrolyze under the conditions that exist in cement slurries and in a set cement matrix. Such polymers also may generate byproducts that may become sorbed into a cement matrix. Calcium salts are a non-limiting example of such byproducts. Non-limiting examples of suitable polyamides include proteins, polyaminoacids, nylon, and poly(caprolactam). Another class of polymers that may be suitable for use are those polymers that may contain hydrolyzable groups, not in the polymer backbone, but as pendant groups. Hydrolysis of the pendant groups may generate a water-soluble polymer and other byproducts that may become sorbed into the cement composition. A non-limiting example of such a polymer includes polyvinylacetate, which upon hydrolysis forms water-soluble polyvinylalcohol and acetate salts.

The degradable particulates may further comprises a stabilizer such as a carbodiimide or a hydrolysis accelerator such as a metal salt, in embodiments the accelerator may be a lightly burnt magnesium oxide.

The particle(s) or the flake(s) can be embodied as material reacting with chemical agents. Some examples of materials that may be removed by reacting with other agents are carbonates including calcium and magnesium carbonates and mixtures thereof (reactive to acids and chelates); acid soluble cement (reactive to acids); polyesters including esters of lactic hydroxylcarbonic acids and copolymers thereof (can be hydrolyzed with acids and bases)

The particle(s) or the flake(s) can be embodied as melting material. Examples of meltable materials that can be melted at downhole conditions hydrocarbons with number of carbon atoms>30; polycaprolactones; paraffin and waxes; carboxylic acids such as benzoic acid and its derivatives; etc. Wax particles can be used. The particles are solid at the temperature of the injected fluid, and that fluid cools the formation sufficiently that the particles enter the formation and remain solid. Aqueous wax are commonly used in wood coatings; engineered wood processing; paper and paperboard converting; protective architectural and industrial coatings; paper coatings; rubber and plastics; inks; textiles; ceramics; and others. They are made by such companies as Hercules Incorporated, Wilmington, Del., U.S.A., under the trade name PARACOL®, Michelman, Cincinnati, Ohio, U.S. A., under the trade name MICHEM®, and ChemCor, Chester, N.Y., U.S.A. Particularly suitable waxes include those commonly used in commercial car washes. In addition to paraffin waxes, other waxes, such as polyethylenes and polypropylenes, may also be used.

The particle(s) or the flake(s) can be embodied as water-soluble material or hydrocarbon-soluble material. The list of the materials that can be used for dissolving in water includes water-soluble polymers, water-soluble elastomers, carbonic acids, rock salt, amines, inorganic salts). List of the materials that can be used for dissolving in oil includes oil-soluble polymers, oil-soluble resins, oil-soluble elastomers, polyethylene, carbonic acids, amines, waxes).

As mentioned when fibers are present in the fluid, i.e. the first fluid contains fibers, said fibers are optional in the second fluid; said fibers may be straight, curved, bent or undulated. Other non-limiting shapes may include hollow, generally spherical, rectangular, polygonal, etc. Fibers or elongated particles may be used in bundles. The fibers may have a length of less than about 1 mm to about 30 mm or more.

In embodiments the fibers may have a length of 12 mm or less with a diameter or cross dimension of about 200 microns or less, with from about 10 microns to about 200 microns being typical. For elongated materials, the materials may have a ratio between any two of the three dimensions of greater than 5 to 1. In certain embodiments, the fibers or elongated materials may have a length of greater than 1 mm, with from about 1 mm to about 30 mm, from about 2 mm to about 25 mm, from about 3 mm to about 20 mm, being typical. In certain applications the fibers or elongated materials may have a length of from about 1 mm to about 10 mm (e.g. 6 mm). The fibers or elongated materials may have a diameter or cross dimension of from about 5 to 100 microns and/or a denier of about 0.1 to about 20, more particularly a denier of about 0.15 to about 6.

The fiber may be formed from a degradable material or a non-degradable material. The fiber may be organic or inorganic. Non-degradable materials are those wherein the fiber remains substantially in its solid form within the well fluids. Examples of such materials include glass, ceramics, basalt, carbon and carbon-based compound, metals and metal alloys, etc. Polymers and plastics that are non-degradable may also be used as non-degradable fibers. These may include high density plastic materials that are acid and oil-resistant and exhibit a crystallinity of greater than 10%. Other non-limiting examples of polymeric materials include nylons, acrylics, styrenes, polyesters, polyethylene, oil-resistant thermoset resins and combinations of these.

Degradable fibers may include those materials that can be softened, dissolved, reacted or otherwise made to degrade within the well fluids. Such materials may be soluble in aqueous fluids or in hydrocarbon fluids. Oil-degradable particulate materials may be used that degrade in the produced fluids. Non-limiting examples of degradable materials may include, without limitation, polyvinyl alcohol, polyethylene terephthalate (PET), polyethylene, dissolvable salts, polysaccharides, waxes, benzoic acid, naphthalene based materials, magnesium oxide, sodium bicarbonate, calcium carbonate, sodium chloride, calcium chloride, ammonium sulfate, soluble resins, and the like, and combinations of these. Degradable materials may also include those that are formed from solid-acid precursor materials. These materials may include polylactic acid (PLA), polyglycolic acid (PGA), carboxylic acid, lactide, glycolide, copolymers of PLA or PGA, and the like, and combinations of these. Such materials may also further facilitate the dissolving of the formation in the acid fracturing treatment. When degradable fibers are being used, they may optionally also be a compounded material containing the stabilizer.

Also, fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like.

In some embodiments, Both treatment fluids may optionally further comprise additional additives, including, but not limited to fluid loss control additives, gas, corrosion inhibitors, scale inhibitors, catalysts, clay control agents, biocides, friction reducers, combinations thereof and the like. For example, in some embodiments, it may be desired to foam the composition using a gas, such as air, nitrogen, or carbon dioxide.

The compounded material may further plasticizer, nucleation agent, flame retardant, antioxidant agent, or desiccant.

The system may be used for carrying out a variety of subterranean treatments, including, but not limited to, drilling operations, fracturing treatments, diverting treatments, zonal isolation and completion operations (e.g., gravel packing) In some embodiments, the composition may be used in treating a portion of a subterranean formation. In certain embodiments, the composition may be introduced into a well bore that penetrates the subterranean formation as a treatment fluid. For example, the treatment fluid may be allowed to contact the subterranean formation for a period of time. In some embodiments, the treatment fluid may be allowed to contact hydrocarbons, formations fluids, and/or subsequently injected treatment fluids. After a chosen time, the treatment fluid may be recovered through the well bore.

As apparent from the above description, the current disclosure enables an optimized acid fracturing treatment by combining a first treatment fluid and a near wellbore solutions; both engineered solution enabling an optimized fluid placement and maximize the efficiency of the treatment when the acid is generated through for example degradation of the acid precursors.

Even if the disclosure was mostly directed towards cased hole treatment, the present technology is equally applicable to open hole treatments.

To facilitate a better understanding, the following examples of embodiments are given. In no way should the following examples be read to limit, or define, the scope of the overall disclosure.

EXAMPLES

Example 1

Figure 5:
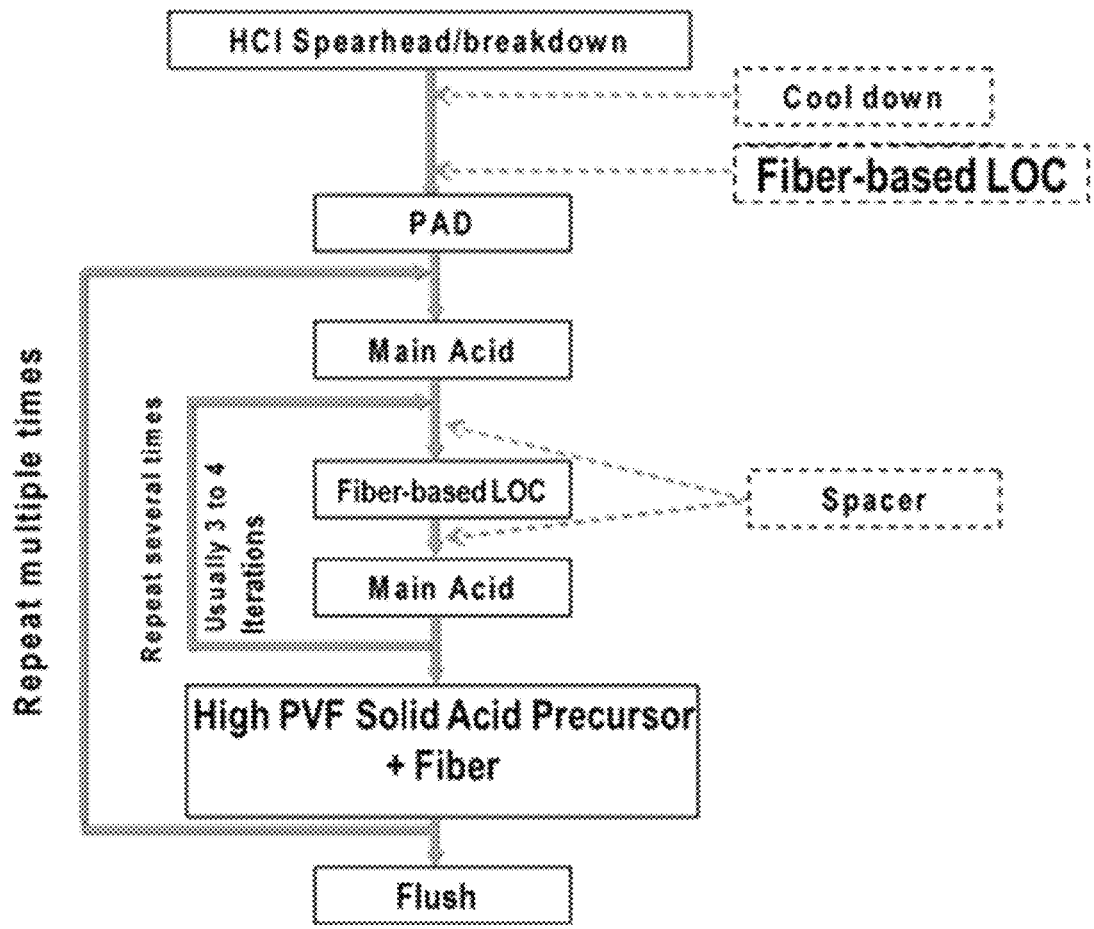
FIG. 5: Acid staging of an acid fracturing treatment according to the current disclosure.

A treatment according to the disclosure is available from FIG. 5.

The operations may starts with a HCl spearhead that is especially important on cased hole Fiber-based acid treatments, when the perforations shall be clean from scales and in order to take fluids. If vugs or open natural fractures are suspected, a Fiber based Leakoff Control (Fiber Based LOC) stage aiming to reduce leakoff into them can be pumped ahead of the main stimulation fluid. In this case Fiber Based LOC will act analogous to Fluid Loss Agent (FLA) on the PAD stage in proppant fracturing treatment. The PAD stage will initiate and cool down the fracture and deposit some filtercake. For leakoff control Fiber Based LOC stage may be pumped in alternating stages with the main stimulation fluid. This cycle usually may be repeated multiple times, depending on the desired fracture geometry. Better results may be achieved if each subsequent Fiber Based LOC have increased fiber concentrations. Spacers fluids may be considered if the stimulation fluid is not compatible with the carrier fluid used in the Fiber-based LOC stage. Once the fracture is propagated to the desired length, a pill of second non acidic fluid (High PVF Solid Acid Precursor) may be placed in the near wellbore region to maximize the near wellbore conductivity. If another region along the wellbore should be fractured, the treatment can continue, relying on the high PVF Solid Acid Precursor to temporary isolate the first fracture.

The foregoing disclosure and description is illustrative and explanatory, and it can be readily appreciated by those skilled in the art that various changes in the size, shape and materials, as well as in the details of the illustrated construction or combinations of the elements described herein can be made without departing from the spirit of the disclosure.

What is claimed is:

1. A method of treating a subterranean formation penetrated by a well bore, the method comprising:
    providing a first treatment fluid comprising fibers in an acidic carrier fluid having a viscoelastic diverting acid (VDA);
    pumping the first treatment fluid in the wellbore above the fracturing pressure of the formation;
    providing a second treatment fluid comprising a non-acidic carrier fluid and blend including a first amount of acid precursor having a first average particle size between about 3 mm and 2 cm and a second amount of acid precursor having a second average size between about 1.6 and 20 times smaller than the first average particle size or a second amount of flakes having a second average size up to 10 times smaller than the first average particle size; and
    creating a plug with the second treatment fluid.

2. The method of claim 1, wherein the carrier fluid of the second treatment fluid is a treatment fluid selected from the group consisting of slickwater, spacer, mutual solvent, flush, fracturing fluid, scale dissolution fluid, paraffin dissolution fluid, asphaltene dissolution fluid, diverter fluid, water control agent, chelating agent, and mixtures thereof.

3. The method according to claim 1, further comprising removing the plug.

4. The method of claim 1, wherein the acid precursor is a polylactic acid material or a polyglycolic acid.

5. The method according to claim 1, wherein the first treatment fluid further comprises degradable particulates.

6. The method according to claim 1, wherein the second treatment fluid further comprises fibers.

7. The method according to claim 1, wherein the second treatment fluid further comprises a third amount of acid precursors having a third average size smaller than the second average size.

8. The method of claim 7, wherein the second treatment fluid further comprises a fourth and a fifth amount of acid precursors having a fourth average size smaller than the third average size, and a fifth average size smaller than the fourth average size.

9. The method according to claim 1, wherein the second treatment fluid is such that a packed volume fraction of the blend exceeds 0.7.

10. The method of claim 1, wherein the method further comprises subjecting the subterranean formation to a further fracturing treatment after the creating of the plug.

11. A system for wellbore treatment in a wellbore, the system comprising:
    a first treatment fluid comprising fibers in an acidic carrier fluid having a viscoelastic diverting acid (VDA); and
    a second treatment fluid comprising a non-acidic carrier fluid and blend including a first amount of acid precursor having a first average particle size between about 3 mm and 2 cm and a second amount of acid precursor having a second average size between about 1.6 and 20 times smaller than the first average particle size or a second amount of flakes having a second average size up to 10 times smaller than the first average particle size.

12. The system of claim 11, wherein the carrier fluid of the second treatment fluid is a treatment fluid selected from the group consisting of slickwater, spacer, mutual solvent, flush, fracturing fluid, scale dissolution fluid, paraffin dissolution fluid, asphaltene dissolution fluid, diverter fluid, water control agent, chelating agent, and mixtures thereof.

13. The system of claim 11, wherein the acid precursors is a polylactic acid material or a polyglycolic acid.

14. The system according to claim 11, wherein the second treatment fluid further comprises fibers.

15. The system according to claim 11, wherein the second treatment fluid further comprises a third amount of acid precursor having a third average size smaller than the second average size.

16. The system of claim 11, wherein the second treatment fluid further comprises a fourth and a fifth amount of acid precursors having a fourth average size smaller than the third average size, and a fifth average size smaller than the fourth average size.

17. The system according to claim 11, wherein the second treatment fluid is such that a packed volume fraction of the blend exceeds 0.7.

18. A method of acidizing a subterranean formation penetrated by a well bore, comprising:
   providing a first treatment fluid comprising an acidic carrier fluid, solid acid precursors and fibers,
   wherein the acidic carrier fluid comprises a viscoelastic diverting acid (VDA);
   pumping the first treatment fluid in the wellbore above the fracturing pressure of the formation;
   providing a second treatment fluid comprising a non-acidic carrier fluid, fibers, and blend including a first amount of solid acid precursor having a first average particle size between about 3 mm and 2 cm and a second amount of solid acid precursor having a second average size between about 1.6 and 20 times smaller than the first average particle size or a second amount of flakes having a second average size up to 10 times smaller than the first average particle size; and
   creating a plug with the second treatment fluid.

* * * * *